United States Patent [19]

Nadan et al.

[11] Patent Number: 4,746,981

[45] Date of Patent: May 24, 1988

[54] MULTIPLE SCREEN DIGITAL VIDEO DISPLAY

[75] Inventors: Joseph Nadan, New York, N.Y.; Edward Bahr, Maywood, N.J.; Paul Noble, New York, N.Y.

[73] Assignee: Imtech International, Inc., New York, N.Y.

[21] Appl. No.: 874,630

[22] Filed: Jun. 16, 1986

[51] Int. Cl.[4] .................... H04N 5/14; H04N 5/262
[52] U.S. Cl. ........................... 358/160; 358/22; 358/183; 340/731
[58] Field of Search ............... 358/22, 160, 183, 287; 382/47; 340/731

[56] References Cited

U.S. PATENT DOCUMENTS

| 4,134,128 | 1/1979 | Hurst | 358/22 |
| 4,163,249 | 7/1979 | Michael et al. | 358/22 |
| 4,282,546 | 8/1981 | Reitmeier | 358/22 |
| 4,528,585 | 7/1985 | Bolger | 358/22 |
| 4,564,865 | 1/1986 | Yamada | 382/47 |
| 4,672,369 | 6/1987 | Preiss et al. | 340/731 |

Primary Examiner—James J. Groody
Assistant Examiner—Michael D. Parker
Attorney, Agent, or Firm—Henry Sternberg; Bert J. Lewen

[57] ABSTRACT

A method and apparatus for displaying an interlaced image on a plurality of display screens in which the lines of two fields of the image are replicated a plurality of times in a memory to produce an enlarged image but determined lines are not read out of the memory for the production of the display screen signals, in order to maintain the original spatial relationship between the lines of the two fields. The addressing of the memory may be varied in order to obtain various special effects in the image on the display screen.

19 Claims, 8 Drawing Sheets

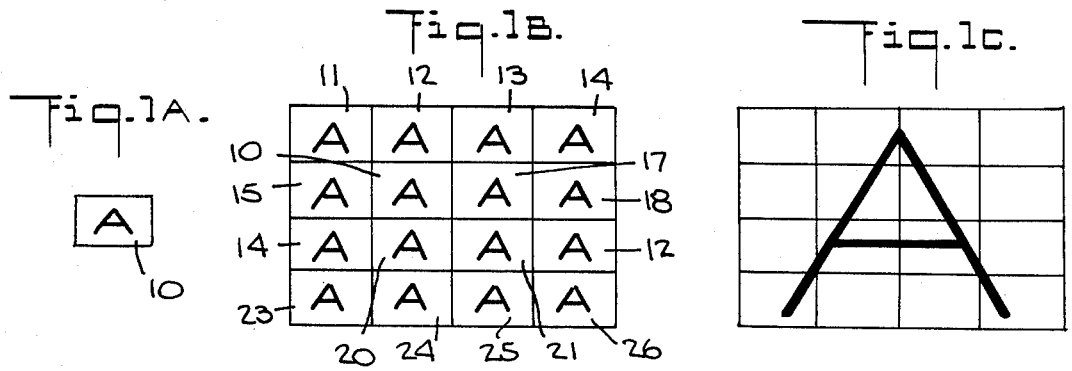
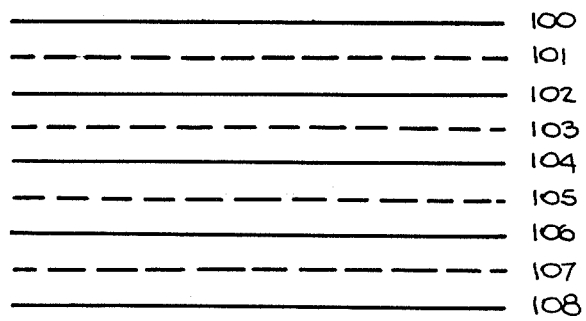
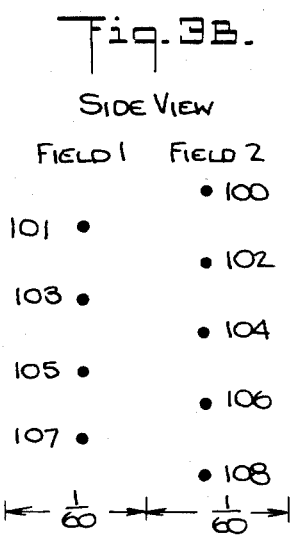

• 100

101 •

• 102

103 •

• 104

105 •

• 106

107 •

• 108

⎵
ORIGINAL

395 •          • 394
              • 396
397 •          • 398
399 •          • 400
401 •          • 402
403 •          • 404
405 •          • 406
407 •          • 408
409 •          • 410
411 •          • 412
413 •          • 414
415 •          • 416
417 •          • 418
419 •          • 420
421 •          • 422
423 •          • 424
425 •          • 426

⎵
EXPANDED BY N=4

| ODD | EVEN |

B

B

B

B

B

B

B

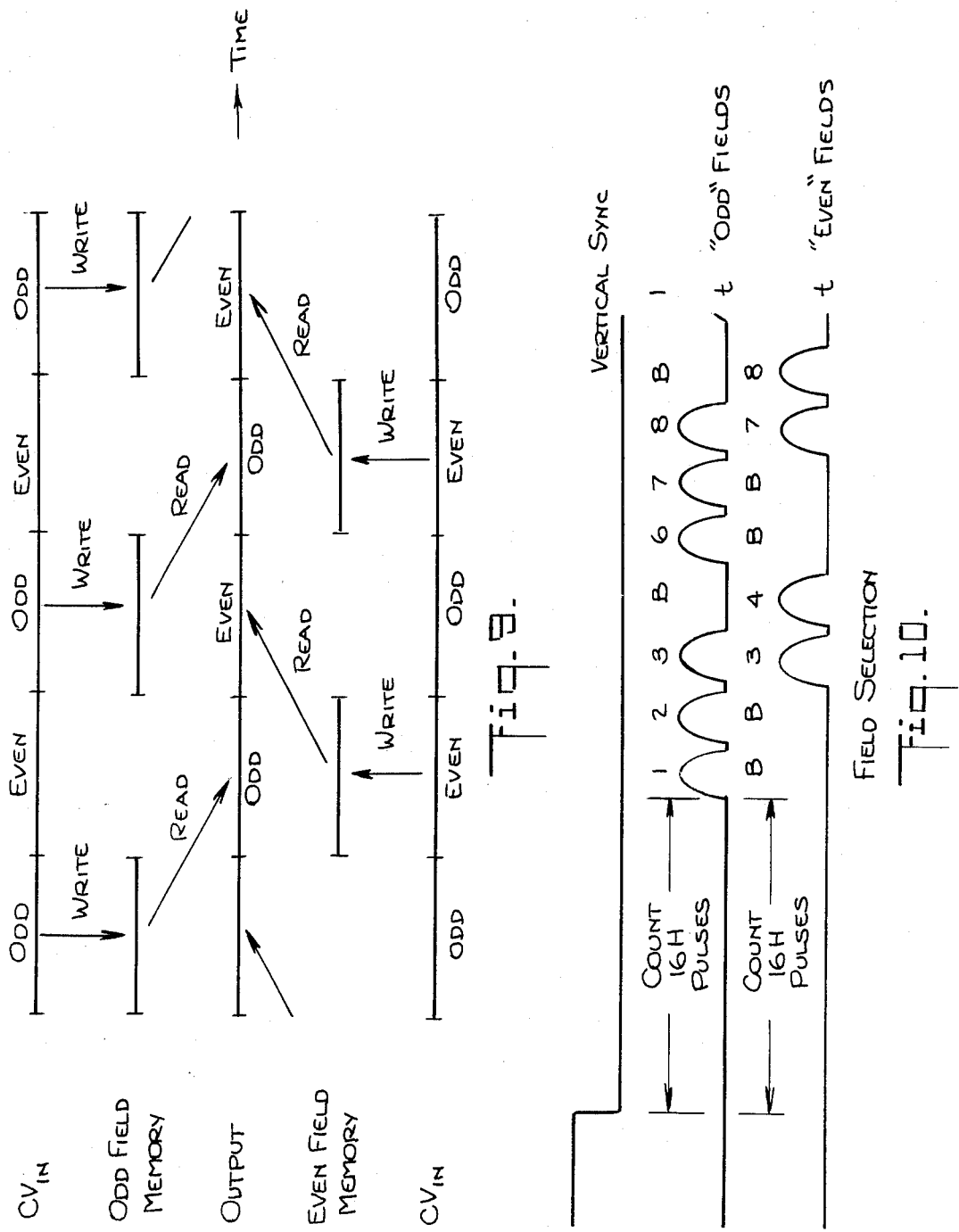

MULTIPLE SCREEN DIGITAL VIDEO DISPLAY

This invention relates to a method and apparatus for displaying an image on a plurality of video screens, such as television screens, and is more in particular directed to a method and apparatus for avoiding annoying visual artifacts and distortions in a composite image formed on the screens of a plurality of display devices.

When video signals are applied to a conventional television set or monitor, the size of the image is of course limited to the size of the display screen of the television set or monitor, and the capacity for providing special effects is limited. Thus, FIG. 1a depicts an image in the form of the letter A on the screen 10 of one television receiver or monitor, in response to the reception of video signals corresponding to this image. It is furthermore possible to physically combine a plurality of television receivers or monitors, to form a larger image. Thus, as illustrated in FIG. 1b, four rows of four television receivers or monitors each have been stacked, to provide separate images on their respective display screens 11–26 respectively, of the letter A, in response to same video signal. It is further possible to modify the video signal corresponding to the letter A for application to the television receivers or monitors of FIG. 1b, so that the composite image on the array of their display screens forms an enlarged image, as illustrated in FIG. 1c. This effect can be created by modifying the signals to apply signals to the different receivers or monitors corresponding to different portions of the image.

Images of the type shown in FIGS. 1b and 1c are advantageous, for example, for visual merchandising, advertising, trade shows, etc.

The enlargement of an image to be displayed by a factor N requires that the number of lines from the video input signal applied to each receiver or monitor be divided by a factor of N. For example, if N equals 4, and the original video signal corresponds to 525 lines, of which about 480 are conventionally displayed, the signal is to be broken down a factor of 4, such that only 120 of the original input lines are displayed on each receiver. Further, only 1/Nth of each line is to be displayed on each receiver. This breakdown of the signals and the portion thereof displayed on each display screen is illustrated in FIG. 2. The breakdown may be effected, for example, by applying the composite video signal to a memory, with each receiver addressing the memory to recover only a determined portion of the stored data. In such an arrangement it is of course desirable to repeat each line or portion of a line N times in succession, where N is the number of vertically stacked display screens, in order to avoid an excessive number of blank lines on the individual display screens.

In the illustrated example, each display screen displays only a quarter of the lines of the video signals that formed the original image, and hence the signal modification requires the selection of the required part of the video line, and stretching it timewise to extend across the full width of the respective display screen.

Unless special care is taken in the modification of the signal for application to each TV set or monitor, a picture will result that has visual artifacts that are noticeably annoying. These artifacts result from the fact that the transmitted picture or frame is in the form of two interlaced fields, i.e., all of the odd number lines, corresponding to the first field, are applied in a first time period of for example one sixtieth of a second, and all of the even numbered lines of the image, corresponding to a second field, are sent in the next successive time period of, for example, one sixtieth of a second. This effect is illustrated in FIG. 3, for the representative example of lines 100 through 108 of an image corresponding to the video signals. Such a signal is said to be "interlaced" since the two fields are displayed spatially within each other, the two one sixtieth of a second fields being employed to build the total picture or frame in one thirtieth of a second.

When the video signals are "expanded" to display the image on a plurality of display screens, it is apparent that the number of the lines (i.e. numbering downward from the top line of a frame) do not directly correspond to the line numbers of the overall image presented by the plural display screens. Thus, since each of the display screens has the same number of lines as those represented in the original video signals, it is apparent that the total number of lines of all the plural display screens is N times the number of lines of the original signal, wherein N is the number of vertically stacked display screens. Assuming for example that four display screens are stacked vertically, then without further steps being taken it is apparent that each line of the original video signals will be displayed four lines apart on the composite display screen, in order to be positioned correctly (omitting for the moment discussion of the contents of the remainder of the lines). Thus, considering interlacing effect in an expanded picture, again with four vertically stacked display screens in the composite image, it is apparent that the lines r in the original image correspond to lines R in the expanded image, in accordance with the following relationship:

$$R_{odd} = 4r_{odd} - 3$$

$$R_{even} = 4r_{even} - 6$$

Thus, in this example, lines 100 through 108 in the image of the original video signals correspond to lines in the range of 394 to 426 in the expanded image, in the manner illustrated in FIG. 4.

An expanded image formed in accordance with the technique of FIG. 4 is unsatisfactory since video signals are displayed only on a fraction of the lines, i.e., one fourth in the illustrated example. In order to overcome this problem, it is of course possible to repeat each video signal line four successive times, in the respective field, for example in the manner illustrated in FIG. 5. In this example, original line 100 of one field has been reproduced at lines 394, 396, 398 and 400 of the expanded field, while line 101 of the other field has been displayed on lines 395, 397, 399 and 401 of the expanded field. It is apparent, however, that the expanded image illustrated in FIG. 5 will be strongly visibly impaired because the vertical spatial relationships in the original picture are destroyed by the interlacing in the expanded picture. Thus, it is apparent in FIG. 5 that the vertical relationship between the lines of the two fields is not maintained, the information of video signal line 101 correctly following the video signal line 100 in the original image, but appearing before video information corresponding to line 100 on several occasions the expanded image. This effect is vertically incorrect and noticeably annoying to the viewer.

It is thus apparent that the simple manner of obtaining an expanded picture as above discussed is not totally satisfactory.

In view of the above discussion, it is of course apparent that complicated techniques may be employed in order to provide the absolutely correct relationship between the lines of the expanded image, such as, for example repeating determined video information in both the odd and even field, so that each video line signal is not intermixed with information of another video line signal, as appears in the representation of FIG. 5.

The present invention is hence directed especially to the provision of a method and apparatus for displaying an expanded image, which does not require complex technology, and which avoids the above discussed vertical distortion.

Briefly stated, in accordance with the invention, the effect of vertical distortion is minimized in a simple manner by the selective replication of video information in the lines of the expanded image, so that, although a few lines of the expanded image may be blanked, the remainder of the lines will appear in their correct vertical orientation. The omission of a small number of lines in the image is not annoying, especially since the vertical distortion is eliminated.

The method and apparatus in accordance with the invention provide the further advantage that special effects in the expanded image be readily achieved, such as, for example, displaying portions of the image in expanded and other portions in unexpanded form, etc.

In order that the invention may be clearly understood, it will now be disclosed in greater detail with reference the accompanying drawings wherein:

FIG. 1, (a) is a representation of a display screen with an image thereon; 1(b) is a representation a plurality of display screens each showing the image 1(a); 1(c) is a representation of a plurality of display screens showing a composite enlarged image corresponding to that of 1(a);

FIG. 2 is a diagram illustrating line assignment of the original signal on the display array of FIG. 1c;

FIGS. 3(A) and (B) are illustrations for explaining interlaced TV signals;

FIGS. 4(A) and (B) are illustrations of the correspondence between original video signal lines and lines of an expanded image;

FIG. 9 illustrates a memory read/write method in accordance with the invention;

FIG. 10 illustrates the selection of fields in accordance with one embodiment of the invention;

Figures 4A, 4B, 5:
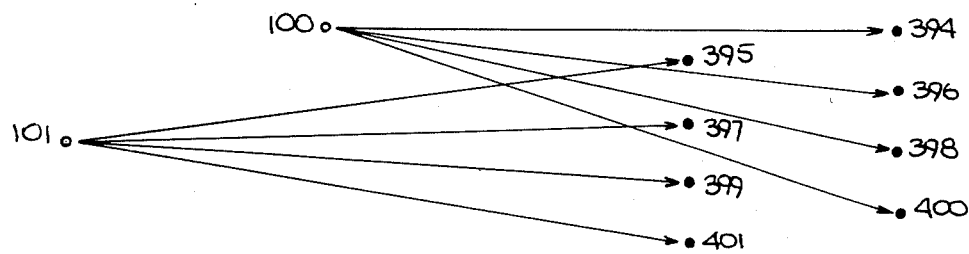
FIG. 5 is an illustration for explaining vertically distorted expansion.
Figures 6, 7:
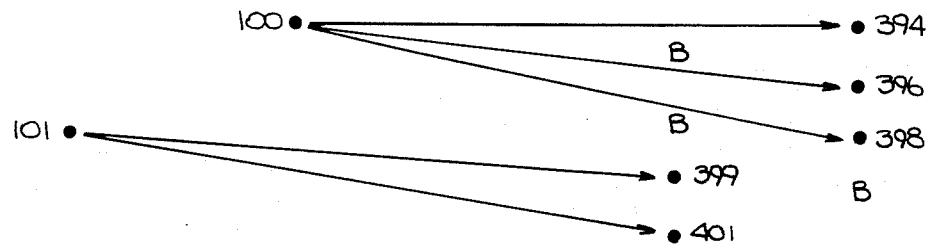
FIG. 6 is an illustration of an expansion technique in accordance with the invention.
FIG. 7 is a further illustration of an expansion illustration in accordance with the invention.

In one illustrative embodiment of the invention, the above discussed vertical distortion may be overcome by blanking every fourth line in the odd fields, and blanking out the first two of every four lines of the even fields, of the enlarged image. This is illustrated in FIG. 6, wherein the lines of the odd and even fields that are displayed are shown as dots, whereas the lines that are blanked are indicated by the letter B. In this illustration, each three successive lines of the odd field replicates the same video line, and the sequences of two even video lines that follow one another replicate the same line from the even video fields. As a result, in the expanded image, only three lines are omitted in each group of eight successive lines representing an odd field video line and the next successive even field video line of the original image. It is further evident that the technique illustrated in FIG. 6 maintains the correct order of information of lines of the odd and even fields.

The correspondence between the original video line and the lines of the expanded image, in accordance with the arrangement of FIG. 6, are shown in FIG. 7, FIG. 7 clearly showing that the first two lines of the odd field are blanked and the last line of the even field is blanked, in each sequence of eight lines in the expanded image. Thus, in accordance with the invention, a non-visual distorted picture may be provided by selectively blanking of the multiply replicated lines of the odd and even fields.

It is of course apparent that other combinations of blank lines and replicated lines may be employed to produce the same effect, within the scope of the invention.

Figure 8:
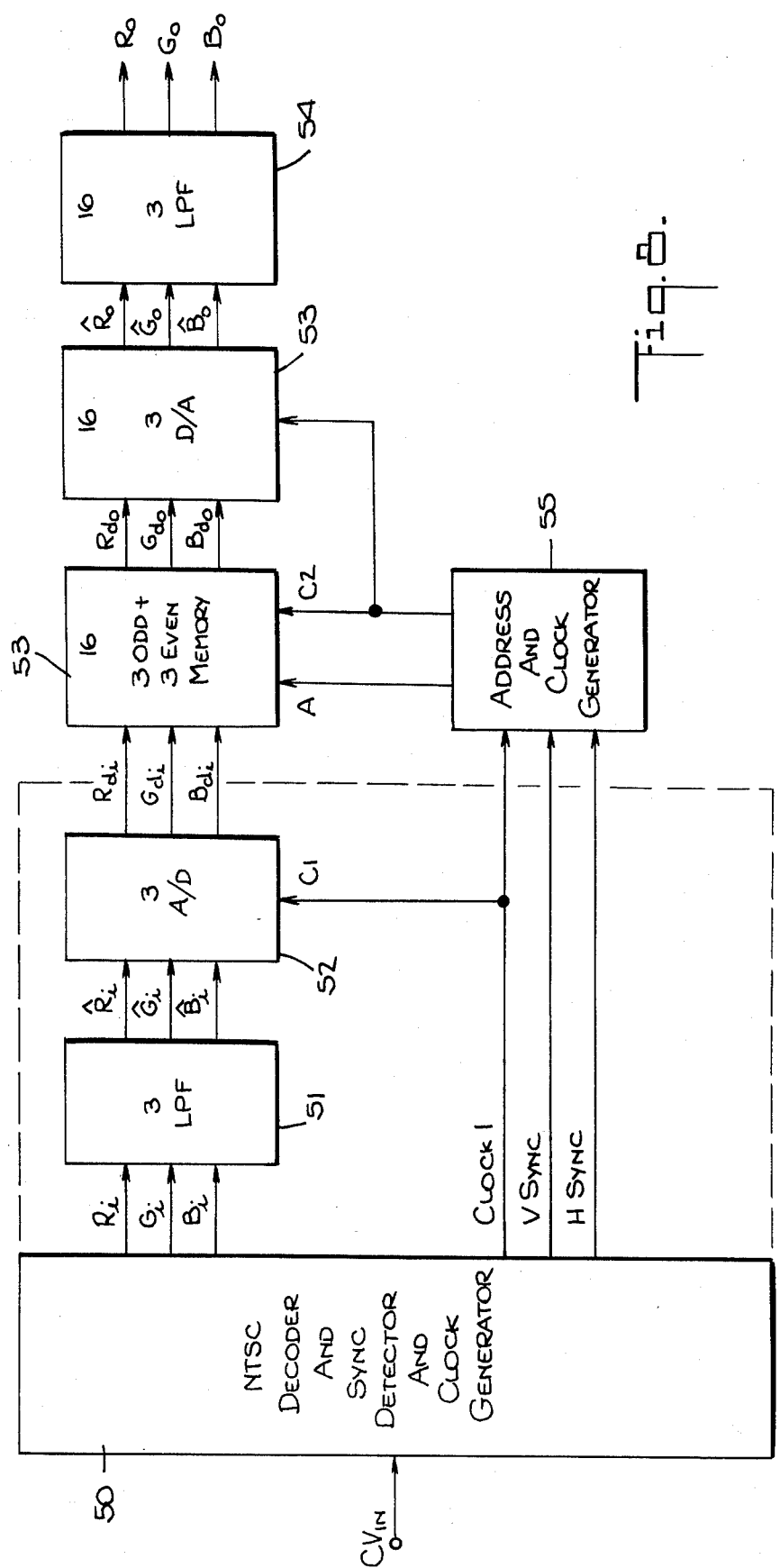
FIG. 8 is a block diagram of a signal processing system in accordance with the invention.

One embodiment of an arrangement that may be employed to modify the video signals in accordance with the invention, for display on multiple display screens, is illustrated in FIG. 8. In this arrangement, a composite video signal CV of conventional nature, for example a color signal in accordance with NTSC requirements, is applied to an NTSC decoder, synchronization signal detector and clock generator 50. This circuit processes television video signals in the conventional manner, to produce, for example, red, green and blue color signals (Ri, Gi, Bi), a clock signal C1, and vertical and horizontal synchronization signals H and V. The color signals are applied to separate low pass filters 51, the drawing hence illustrating three such filters. The filters prepare the signals for digitization to prevent aliasing. Separate filtered color signals are then applied to separate analog to digital converters 52, the figure illustrating three such converters. The digitization rate is determined by the clock C1 from the clock generator, is of a rate adequate to digitize signals of the frequency of the video signals, in accordance with conventional practice. The generation of the clock signals in the circuit 50 may of course be effected in accordance with conventional practice.

The digitized color signals are then applied to memories 53. In accordance with one embodiment of the invention, it is preferable to provide a memory system for each of the display screens in the expanded display, for example 16 memory systems in the above discussed example employing 4 rows of vertically stacked display screens, each having 4 display screens. Further, each memory system preferably incorporates three memories for storing the separate color signals of odd fields, and three memories for storing the separate color signals of even fields. It is of course apparent that for a black and white display only a pair of memories, for the odd and even fields, need be employed.

The read output of the memory systems for corresponding display screens are directed to separate digital to analog converters 53, and then to separate low pass filters 54, to produce the output color signals (Ro, Go, Ro) for application to the respective separate display screens. Thus, in the illustrated example, each read out color signal for each display screen is processed through a separate digital to analog converter and a separate low pass filter. The read/write control and addressing of the memories 53 is effected by an address and clock generator 55, the address and clock generator providing address signal A for the memories, and clock signals C2 for the memories and the converters 53. Addressing clock pulses are synchronized with the vertical and horizontal synchronization signals as well as with the clock signal from the circuit 50. The operation of the address and clock generator 55 will be discussed in greater detail in the following paragraphs.

A preferred method for writing data in the memories, and reading data therefrom, is illustrated in FIG. 9, wherein the top and bottom horizontal lines of the figure illustrate the composite video input signal CVin, with the sequential odd and even field data. In accordance with the invention, the video information of the odd fields is written in the odd field memory, and the video information from the even fields is written into the even field memory. The data corresponding to the odd fields is read from the odd field memory at a time delayed one field time from when it was written, and, similarly, data in the even fields is read from even field memory at a time delayed by one field from the time when this data was written in the memory. By employing this double buffering technique, each memory is always being either written to or read from, but not simultaneously.

The method of detecting odd or even fields is based upon the standard NTSC format, in which the starting line of the image of one field occurs an integral number (16) of horizontal pulses following the vertical synchronization pulse, while the first horizontal pulse corresponding to a line to be displayed occurs at a time corresponding to an integral number (16) plus one half horizontal line period following the vertical synchronization pulse. It is hence only necessary to count horizontal pulses following the vertical synchronization pulse to determine whether the current video information is derived from an odd or an even field.

In accordance with a preferred embodiment of the invention the video information is stored in the memory system of each display screen in accordance with the sequence of signals to be displayed on the respective display screen, so that the data may be readily sequentially read out from the rows of the odd and even field memories of that display screen. It will of course be apparent that other memory storage techniques may be employed alternatively, employing different memory read out techniques. In the preferred technique, however, after the detection of the reception of data corresponding to an odd field, the video information of the first line of the video signal is replicated in the first three rows (or the equivalent thereof) of the odd field memory, the fourth row thereof being left blank. Similarly, the video information from the third video line of the original video signal is replicated in the next three rows of the odd field memory, with the following row being left blank, etc. Upon the detection of the reception of video information from an even field, the video information of the first line is replicated in the third and fourth rows of the even field memory with the first two rows being left blank. Then, video information from the second line of the even field video signal is replicated on the seventh and eighth row of the even field memory, with the fifth and sixth rows left blank. This technique is illustrated in FIG. 10. When the data is stored in this manner, the even and odd field memories may read out on a row by row basis, to produce the output video information directly for the respective display screen. As will be discussed in greater detail in the following paragraphs, however, the lines of original video information that are stored in each memory correspond only to those lines that will be displayed on the given display screen, the representation of FIG. 10 thus being correct only for the top row of display screens when the display screens are stacked four high in the vertical direction. Data stored for display screens of different vertical levels must have correspondingly different sequences of lines of the original video signal.

Figure 11:
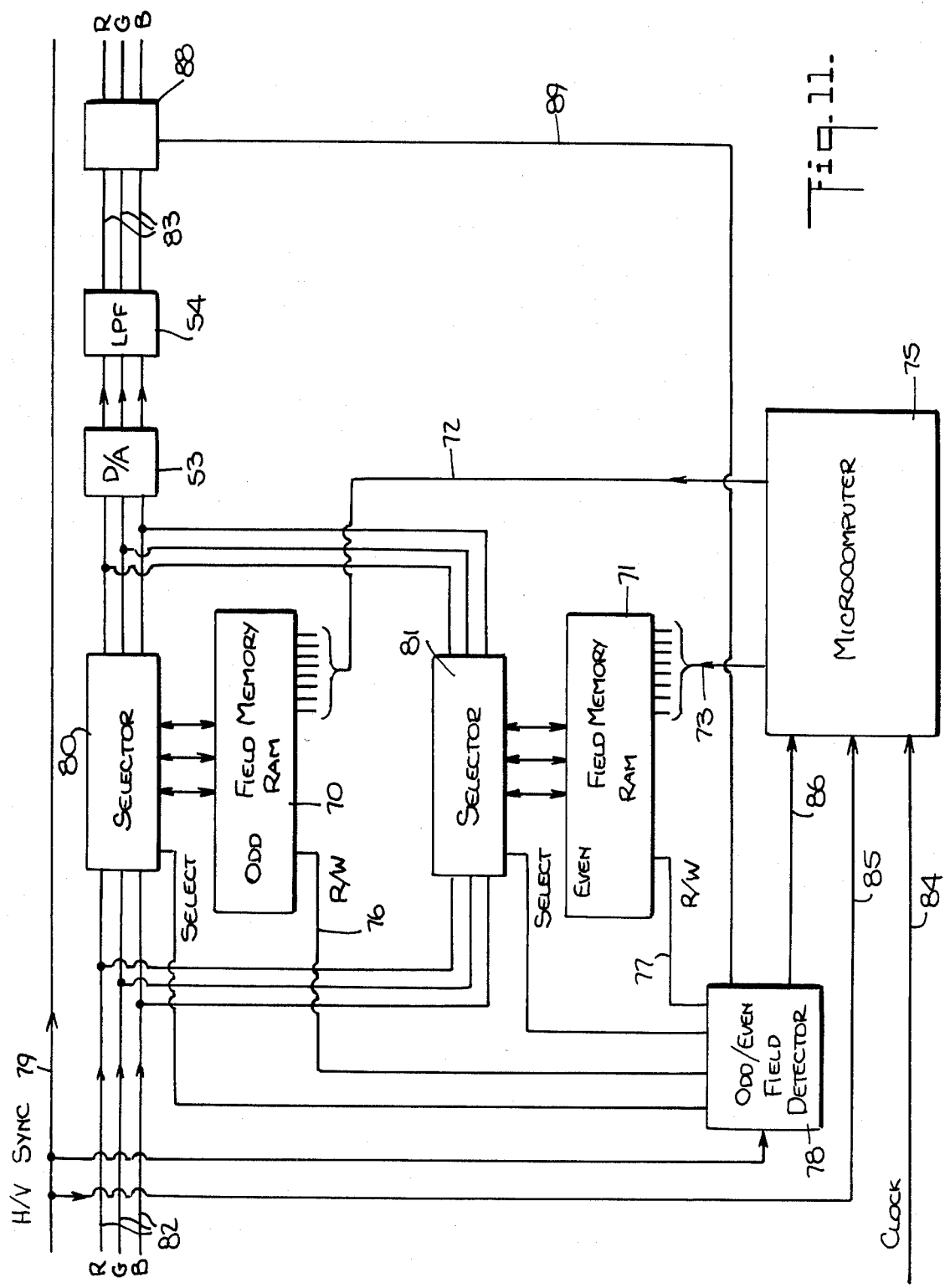
FIG. 11 is a more detailed block diagram of a portion of the system of FIG. 8.

One arrangement that may be employed in accordance with the invention for storing the video data and reading it out, is illustrated in FIG. 11. This figure illustrates a system for storing the color signals of a single display screen in the expanded image, for the odd and even fields. Thus, the odd field memory 70 may comprise three separate memories, and the even field memory 71 may similarly comprise three separate memories. The memories 70, 71 may be of any conventional RAM structure, having address lines 72, 73 respectively connected to a microcomputer 75. The memories 70, 71 further have read/write select lines 76, 77 coupled to an odd/even field detector 78, for enabling the odd field memory, to have data written therein during the occurrence of odd fields and to have data read therefrom during even fields. Similarly, the detector 78 enables the even field memory to have data written into it during the even field and data read therefrom during the odd fields of the video input signal. For this purpose the detector 78 may receive the horizontal and vertical synchronization signals from the line 79, determining the present field by conventional means such as discussed above. In order to direct the color signals to the respective memories during the proper fields, and to read the memories to apply the recovered signals for application to the display, conventional selectors 80, 81 may be provided connected to the data lines of the memories 70, 71. The select lines of the selectors 80, 81 are also controlled by the odd/even detector. Thus, the original color signals R, G and B on lines 82 are applied to each of the selectors 80, 81. During the odd fields the select line of the selector 80 couples the video signal lines 82 to odd field memory 70, and couples the output video lines 83 to the even field memory 71. Similarly, during the even fields of the original signal, the incoming video signals on lines 82 are applied by way of the selector 81 and the output lines 83 are coupled to read out the odd field memory 70.

The microcomputer 75, which may be of conventional design, provides the address sequences for reading out and writing in memories 70, 71, and may, for example, have as further inputs the output of the detector 78, the horizontal and vertical synchronization signals and the clock signal that was employed for controlling the analog to digital conversion illustrated in FIG. 8. The program of the microcomputer thus sequences the address on the address lines 72, 73, for example at the rate of the clock on line 84, which may derived from the clock generator of FIG. 8. The program of the microcomputer maintains a count of the current line in the original video signal, in response to the horizontal and vertical synchronization signals, as well as a count the clock on line 84, in order to enable the stepping of the address signals for memories 70, 71 to commence at determined lines and positions on the lines of the original video signal. The desired starting lines and positions of the lines of the original signals may be automatically controlled by the program of the microcomputer 75, or the desired value may be input by way of a conventional keyboard of the microcomputer.

The replication of the signal to appear in a number of selected rows of the memory, in order to avoid the vertical distortion above discussed, may be effected by sequentially addressing the desired rows of the memory during the occurence of each color signal pulse, at a rate faster than the digital rate of the signals. Similarly, the expansion of signals in the horizontal direction may be effected by stepping the addresses for each line at a rate that is a multiple of color signal pulse rate. These rates may of course be varied, if desired, by keyboard control of the microcomputer.

As further illustrated in FIG. 11, an attenuator 88 is provided in the output video lines, the attenuator being controlled by the Odd/Even Field Detector 78 via line 89. The purpose of the attenuator 88 is to reduce "wide area flicker" arising from unequal numbers of non-blanked lines in each of the two fields. The field indication signal on line 89 is high during the time when the field having the higher number of non-blank lines is present. This field indication signal attenuates the amplitude on the R-G-B signal by an amount to reduce its average level of brightness to that of the field having the smaller number of non-blank lines. For example, if field 1 has 3 non-blank lines, and field 2 has 2 non-blank lines, then the amplitude of the R-G-B signal from field 1 should be reduced to $\frac{2}{3}$ of its former value, such that the 3 lines of field 1, having their intensity multiplied by $\frac{2}{3}$ have the same average brightness as the 2 lines of field 2.

While a microcomputer has been illustrated as constituting one arrangement for providing the desired addressing sequences for the memories, it is of course apparent that other arrangements, such as hard wired random logic circuits, may alternatively be employed for this purpose.

The arrangement in accordance with the invention is especially adapted for the easy creation of special effects. When the address of the line to be read is changed (incremented to the next line in the field being displayed) on every line being displayed, then each of the sixteen display screens will display the original and total signal input picture, assuming again the four by four arrangement of display screens as above discussed. When, however, the address of the line to be read is changed every N=4th line being displayed, each of the sixteen monitors will display $1/N^2=1/16$ the original picture.

Figure 12A:
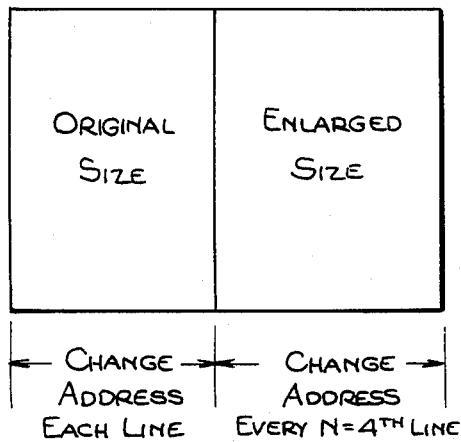
FIGS. 12a–12c illustrate various horizontal special effects that may be readily achieved in accordance with the invention.
Figure 12B:
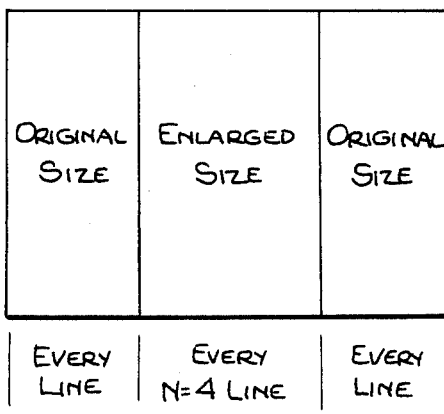
Figure 12C:
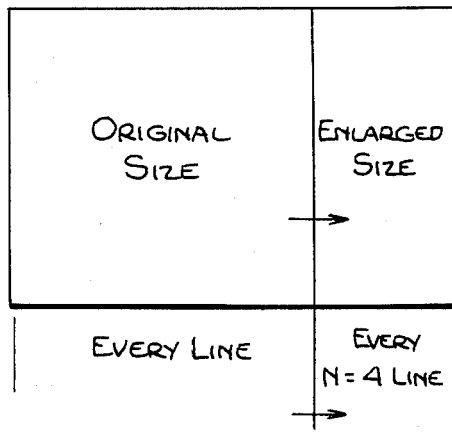

The address of the line being read can be changed at any time. When it is changed at the same position on every line, then "half" of each monitor will display part of the original and total input signal picture and the other "half" of each monitor will display part of the enlarged picture. This is illustrated in FIG. 12a. It is also possible to change from one mode to the other mode several times on a line. This is illustrated, for example, in FIG. 12b. Further, by moving the position of the change it is possible to "horizontally wipe" from single mode to enlarged mode in a gradual manner. This is illustrated in FIG. 12c.

In a similar but coordinated manner horizontal wipes may be synchronized across each monitor to occur in the position on one or more display screens simultaneously. Hence, the wipe can go across from the extreme left to the extreme right of the entire array of display screens in a gradual manner. It is of course apparent that other modifications and techniques may be employed in a similar manner.

Figure 13A:
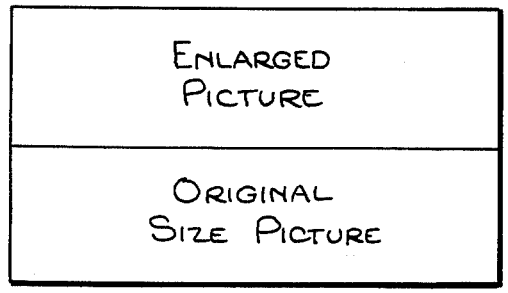
FIGS. 13a–13c illustrate various vertical special effects that may be readily achieved in a system in accordance with the invention.
Figure 13B:
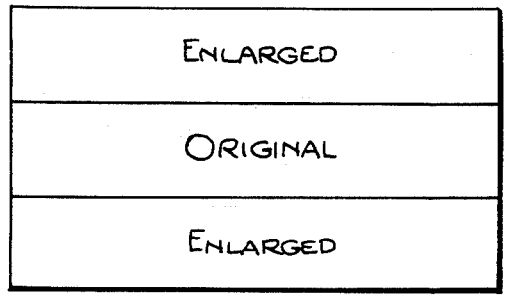
Figure 13C:
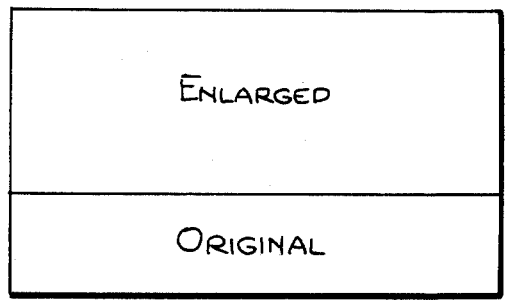

By changing the addressing mode in synchronization with the beginning of a line, we are further able to create vertical "special effects". These are illustrated, for example, in an analogous manner in FIGS. 13a, b and c.

Vertical and horizontal special effects may be combined to produce further effects such as diagonal wipes. In addition, each color may be wiped, or not wiped, in the same manner as desired. Still further, the program may control each color signal to be gated on or off at any time during the image, for example to create flashing patterns. Still further, mosaics may be created with, or without flashing colors, by combining vertical and horizontal special effects.

Reference has made herein to the display screens of television sets or receivers and monitors. It will be apparent, from the standpoint of the present invention, that any conventional display device may be employed in accordance with the invention, and the foregong disclosure hence employs such terms in a synonymous manner.

While the invention has been disclosed and described with reference to a limited number of embodiments, it is apparent that variations and modifications may be made therein without varying from the spirit and the scope of the invention, and it is therefore intended in the following claims to cover each such variation and modification falls within the true spirit and scope of the invention.

What is claimed is:

1. A method for producing display signals, from video signals, for application to a monitor, for the displaying on said monitor of a partial image that is formed by only a portion of the information of said video signals, said video signals containing successively occurring video field data of first and second interlaced fields of a full image, video data of each field comprising successively occurring video line data corresponding to successive scan lines of the respective field; said method comprising:

writing said video signals in a memory for storing therein at least a portion of the video line data of each said field, and reading said memory to produce said display signals, said step of reading comprising sequentially reading video line data from said memory corresponding to at least portions of determined scan lines of the full image a plurality of times for each of said fields while omitting the reading of video line data for determined scan lines of said display signals, whereby the physical relationship of the lines of the first and second fields is maintained in said partial image.

2. The method of claim 1 wherein said step of writing comprises writing video information corresponding to each of a plurality of scan lines of each of said fields at a plurality of first locations in said memory, said step of reading comprising separately reading out only determined ones of said plurality of locations for each of a plurality of scan lines.

3. The method of claim 1 wherein said determined scan lines are different for said first and second fields.

4. The method of claim 1 wherein said memory has a plurality of first storage locations corresponding sequentially to first field lines of said display signals and a plurality of second storage locations corresponding sequentially to second field lines of said display signals, said step of writing comprising writing video information corresponding to determined lines of the first field of said full image at each of a plurality of successive first locations separated by at least one said first location from other first locations at which video information corresponding to other determined lines of the first field is written, and writing video information corresponding to determined lines of the second field of said full image at each of a plurality of successive second locations separated by at least one said second location from other said second locations at which video information corresponding to other determined lines of the second field is written.

5. The method of claim 4 wherein said step of reading comprises sequentially reading said first locations and sequentially reading said second locations.

6. The method of claim 1 wherein said memory has a plurality of first storage locations corresponding sequentially to first field lines of said display signals and a plurality of second storage locations corresponding sequentially to second field lines of said display signals, said step of writing comprising writing video information corresponding to said first and second fields during the occurrence of said first and second fields respectively and said step of reading comprises reading video information corresponding to said first and second fields of said video information during the occurrence of said second and first fields respectively.

7. An apparatus for producing display signals, from video signals, for producing an image that contains only a portion of the image information of said video signals, wherein said video signals contain successively occurring video field data of first and second interlaced fields of a full image, the video data of each field comprising successively occurring video line data corresponding to successive scan lines of the respective fields; said apparatus comprising:
 memory means,
 means applying said video signals to said memory means for storing therein at least a portion of the video line data of each said field,
 and means for reading said memory to produce said display signals,
 said reading means comprising means for sequentially reading video line data corresponding to determined scan lines of the full image a plurality of times for each of said fields while omitting the reading of video line data corresponding to determined scan lines of said display signals, whereby the physical relationship of the scan lines of the first and second fields is maintained in said first mentioned image.

8. The apparatus of claim 7 wherein said memory means comprises first and second memories connected to receive video information corresponding to said first and second fields respectively, said means applying said video signals to said memory comprising means applying video signals to said first and second memories during the occurrence of said first and second fields of said video signals respectively, said reading means comprising means for reading said first and second memories during the occurrence of said second and first fields of said video signals respectively.

9. The apparatus of claim 7 further comprising a source of analog signals, and analog to digital converter means for converting said analog signals to said digital video signals.

10. The apparatus of claim 7 wherein said memory means comprise first and second addressable memories for storing video information of said first and second fields respectively, and further comprising addressing means coupled to said memories for addressing the storage locations thereof.

11. The apparatus of claim 10 wherein said addressing means comprises means for addressing said memories to store video data corresponding to determined scan lines of said video signals at each of a plurality of locations, and means for addressing said memories to read video data sequentially from said locations, whereby said display signals contain successive data with the same video information corresponding to a plurality of successive lines of said display signals.

12. A method for enlarging an image on a display device in response to video signals, wherein said video signals contain successively occuring video field data of first and second interlaced fields, the video data of each field comprising successive video scan line data corresponding to successive scan lines of the respective fields, said method comprising selecting a given group of scan lines of each of said fields, replicating the video data of the selected lines of each of said fields each at a plurality of first locations in a memory while leaving determined second locations free of video data, and reading said first and second memory locations in a sequence to maintain the physical relationship between video lines of said first and second fields on said display device.

13. The method of claim 12 wherein said step of reading comprises reading at least one second location following each reading of a group of first locations corresponding to the same scan line of the video signals.

14. The method of claim 1 further comprising adjusting the relative brightness of the signals read out from said memory for the respective fields whereby the average brightness of the video lines of the fields is substantially equal.

15. The method of claim 14 wherein said step of adjusting comprises attenuating the signals from the memory corresponding to the field having lesser blank lines in the image to be displayed on the monitor.

16. The apparatus of claim 7 further comprising means for adjusting the relative brightness of signals from the memory means corresponding to the respective fields, whereby the average brightness of the video lines of the fields is substantially equal.

17. The apparatus of claim 16 wherein said adjusting means comprises attenuator means connected to attenuate signal from the memory means corresponding to the field having lesser blank lines in the image to be displayed.

18. The method of claim 1 wherein said step of reading comprises modifying the sequence of reading out of said memory at a determined time during the readout of data corresponding to a given video line, for each of a plurality of said video lines.

19. The method of claim 1 wherein said step of reading comprises modifying the sequence of reading out of video line data at a determined time during the readout of video lines for each said field.

* * * * *